R. H. L. PENNELL & J. ORTEN-BÖVING.
MEANS FOR COLLECTING AND DISCHARGING SOLID MATTER WHEN PUMPING LIQUIDS
CONTAINING SAME.
APPLICATION FILED AUG. 6, 1914.

1,161,517.

Patented Nov. 23, 1915.
2 SHEETS—SHEET 1.

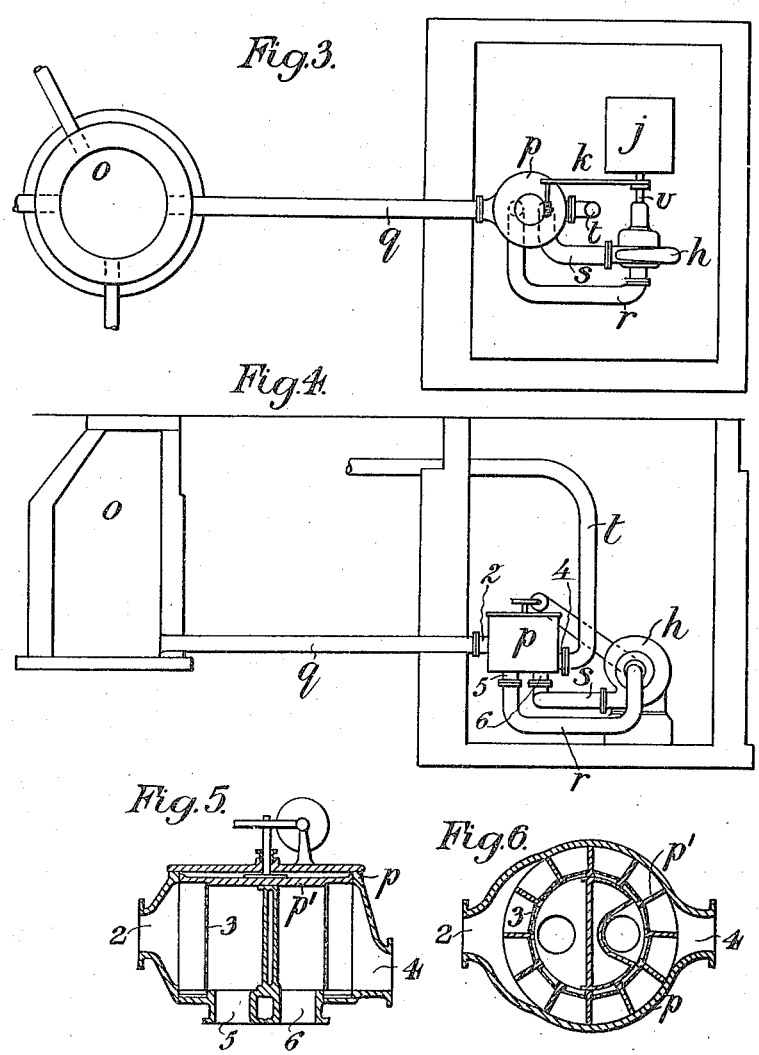

UNITED STATES PATENT OFFICE.

REGINALD HUMPHREY LEE PENNELL, OF CAIRO, EGYPT, AND JENS ORTEN-BÖVING, OF LONDON, ENGLAND.

MEANS FOR COLLECTING AND DISCHARGING SOLID MATTER WHEN PUMPING LIQUIDS CONTAINING SAME.

1,161,517. Specification of Letters Patent. Patented Nov. 23, 1915.

Application filed August 6, 1914. Serial No. 855,423.

*To all whom it may concern:*

Be it known that we, REGINALD HUMPHREY LEE PENNELL, of Rue Nag-Hamadi, Heliopolis, Cairo, Egypt, late of Gebel El Asfar Farm, Khanka, Egypt, and JENS ORTEN-BÖVING, of 9½ Union court, Old Broad street, London, England, having invented certain new and useful Improvements in or Relating to Means for Collecting and Discharging Solid Matter When Pumping Liquids Containing Same, do hereby declare that the following is a full, clear, and exact description of the same.

This invention relates to intercepting chambers for use with pumps employed in raising liquids containing solid matter.

The object of this invention is to provide a trap which will collect the silt or solid matter before it enters the pump and be automatically cleansed by the liquid discharged from the pump.

According to this invention we provide in pumping installations a sedimentation chamber or trap, arranged either for periodic or continuous working through which trap the liquid has to pass on its way to the pump and through which it has to pass when it is delivered by the pump.

Figure 1:
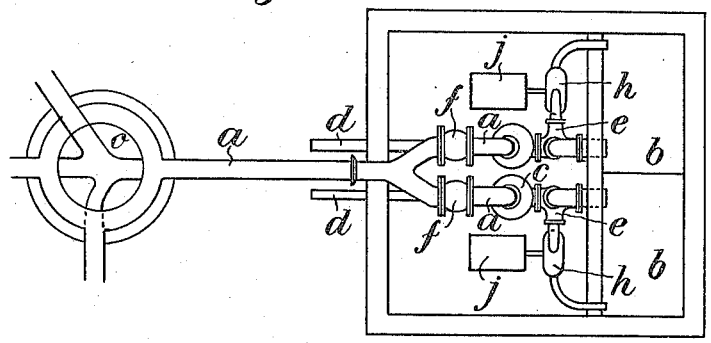
Figure 2:
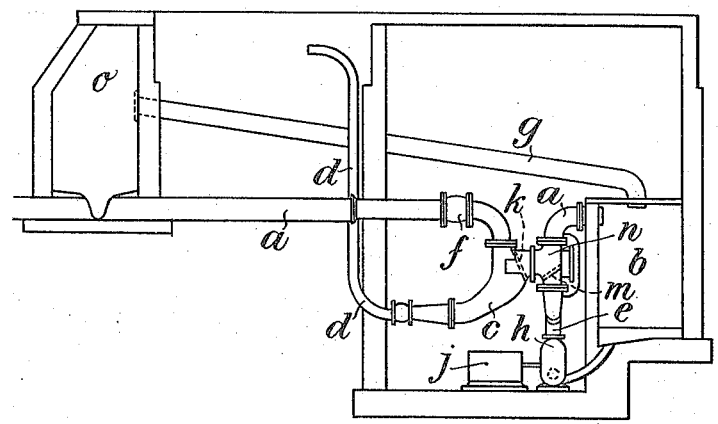

Figure 1 is a diagrammatic plan showing a trap adapted for use in accordance with this invention when pumping sewage intermittently in accordance with this invention. Fig. 2 is an elevation thereof. Fig. 3 is a diagrammatic plan showing a rotary trap adapted for use when pumping sewage continuously. Fig. 4 is an elevation thereof. Fig. 5 is a sectional elevation of the trap. Fig. 6 is a horizontal section thereof.

Referring to Figs. 1 and 2, $a\ a\ a\ a$, is the inlet pipe from manhole to trap and trap to sump. $b\ b$ is the sump. $c\ c$ are traps. $d$ are the delivery mains from the pump leaving the traps. $e\ e$ are the delivery mains from the pumps entering the traps. $f\ f$ are reflux valves. $g$ is an overflow from the manhole to the sump or sumps. $h\ h$ are centrifugal pumps adapted to be driven by dynamo electric machines $j\ j$. $k$ is a screen which may be provided in some cases. $m$ is a flap in the valve $n$ to direct the flow of the sewage. Means are provided for starting the pumps as and when the sump in connection therewith is filled with sewage. In use the sewage passes from the manhole $o$ into and through the trap $c$ and so into the pump. The sewage is then pumped through the trap carrying all the solids in the trap up the delivery main, the flap $m$ automatically directing the course of the flow of the liquid.

Referring to Figs. 3, 4 5 and 6, $p$ is a trap of the rotary type. $q$ is the inlet pipe from the manhole $o$, $r$ is a pipe connecting the trap $p$ to the suction side of the pump $h$. $s$ is a pipe connecting the delivery side of the pump $h$ to the trap $p$. $t$ is the delivery main from the trap $p$. The pump $h$ is driven by the dynamo electric machine $j$. $k$ is the belt transmission for driving the rotary trap $p$ from the pump shaft $v$. In use the rotary member $p'$ of the trap is slowly rotated, the sewage passes from the manhole $o$ into the trap $p$ by the inlet 2 through the revolving grating 3 out of the trap at 5 to the pump $h$ and from the pump $h$ into the trap at 6 and through the grating 3 and outlet 4, carrying with it all the solid matter which has been arrested by the trap and which has been transferred from the inlet side to the outlet side of the trap by rotation.

With apparatus made in accordance with this invention solid matter is collected and discharged without passing through the pumps.

What we claim and desire to secure by Letters Patent is:—

In pumping installations a sedimentation chamber or trap comprising an outer casing, a liquid inlet in said casing, a rotatable screen located within said casing, vanes dividing the outer periphery of the screen into separate sections, an outlet in said casing to conduct liquid from the inner side of said screen to a pump, an inlet in said casing from said pump to the inner side of said screen, an outlet from said casing to conduct away the liquid and sedimentation, and means for rotating said screen.

In witness whereof, we have hereunto signed our names in the presence of two subscribing witnesses.

REGINALD HUMPHREY LEE PENNELL.
JENS ORTEN-BÖVING.

Witnesses:
REGINALD EATON ELLIS,
ROBERT MILTON SPEARPOINT.

Copies of this patent may be obtained for five cents each, by addressing the "Commissioner of Patents, Washington, D. C."